United States Patent
Drees et al.

(10) Patent No.: US 9,675,946 B2
(45) Date of Patent: *Jun. 13, 2017

(54) MIXING BOWL LINER AND LID (75) Inventors: Steven C. Drees, Stevensville, MI (US); Thomas A. Gillette, Stevensville, MI (US); David M. Neidlinger, Stevensville, MI (US); Paul S. Paget, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/337,348

(22) Filed: Dec. 27, 2011

(65) Prior Publication Data

US 2012/0170404 A1     Jul. 5, 2012

Related U.S. Application Data (60) Provisional application No. 61/427,964, filed on Dec. 29, 2010.

(51) Int. Cl.
| | | |
|---|---|---|
| *B01F 7/16* | (2006.01) | |
| *B01F 7/30* | (2006.01) | |
| *B01F 7/32* | (2006.01) | |
| *B01F 15/00* | (2006.01) | |
| *A47J 43/07* | (2006.01) | |

(52) U.S. Cl.
CPC ......... *B01F 7/1615* (2013.01); *A47J 43/0705* (2013.01); *A47J 43/0727* (2013.01); *B01F 7/30* (2013.01); *B01F 7/32* (2013.01); *B01F 15/00837* (2013.01)

(58) Field of Classification Search
CPC ..................................................... B01F 7/1615
USPC ........................... 366/197; 220/23.87, 23.89
See application file for complete search history.

(56) References Cited

U.S. PATENT DOCUMENTS

| | | | | |
|---|---|---|---|---|
| 2,179,807 A | * | 11/1939 | Asmussen | 494/27 |
| 2,332,173 A | * | 10/1943 | Shaffer | 220/574.2 |
| 2,507,425 A | * | 5/1950 | Swartout | A47J 47/02 |
| | | | | 126/281 |
| 2,545,733 A | * | 3/1951 | Hatfield | 220/574.2 |
| 2,648,514 A | * | 8/1953 | Rosier et al. | 248/131 |
| 2,765,832 A | | 10/1956 | Tupper | |
| 2,886,225 A | * | 5/1959 | Clarke | 220/23.83 |
| 3,070,275 A | * | 12/1962 | Bostrom | 229/4.5 |
| 3,349,941 A | * | 10/1967 | Wanderer | 220/23.88 |
| 3,365,092 A | * | 1/1968 | Blessing | 220/23.88 |
| 3,745,290 A | * | 7/1973 | Harnden et al. | 219/621 |
| 3,882,763 A | * | 5/1975 | Ellerbrock et al. | 493/67 |
| 3,946,893 A | * | 3/1976 | Bowersmith | 220/573.4 |

(Continued)

FOREIGN PATENT DOCUMENTS

| | | |
|---|---|---|
| DE | 29713859 U1 | 4/1997 |
| DE | 102007043726 A1 | 4/2009 |

(Continued)

*Primary Examiner* — Abbas Rashid
(74) *Attorney, Agent, or Firm* — Price Heneveld LLP (57) ABSTRACT

A bowl liner for a mixing bowl of a stand mixer includes a shell and a rim secured an upper end of the shell. The shell is sized to be received in the mixing bowl, and is formed from an elastomeric material. The shell has a mixing chamber defined therein. The rim includes an outer perimeter surface that has a keyed surface section to locate the liner relative to the stand mixer.

18 Claims, 8 Drawing Sheets

(56) References Cited

U.S. PATENT DOCUMENTS

| | | | |
|---|---|---|---|
| 3,952,677 A * | 4/1976 | Hartman et al. | 413/7 |
| 3,995,840 A * | 12/1976 | Smader | 366/98 |
| 4,015,945 A | 4/1977 | Frankel et al. | |
| 4,042,143 A * | 8/1977 | Biggins | 220/256.1 |
| 4,047,633 A * | 9/1977 | Trombly | 220/592.2 |
| 4,076,207 A | 2/1978 | Austin | |
| 4,185,072 A * | 1/1980 | Puderbaugh et al. | 422/547 |
| 4,756,446 A * | 7/1988 | Gen et al. | 206/457 |
| 4,759,148 A * | 7/1988 | Love | 43/54.1 |
| 5,085,391 A * | 2/1992 | Berger et al. | 248/311.2 |
| 5,425,921 A * | 6/1995 | Coakley et al. | 422/547 |
| 5,911,505 A * | 6/1999 | St. John | A21C 1/02 366/200 |
| 6,401,955 B1 * | 6/2002 | Yang | 220/23.87 |
| 6,722,262 B2 * | 4/2004 | Tervo et al. | 92/103 R |
| 7,204,202 B2 * | 4/2007 | Behun et al. | 119/61.5 |
| 7,832,586 B2 * | 11/2010 | Vovan | 220/23.89 |
| 7,905,172 B2 * | 3/2011 | Ohrle et al. | 92/103 R |
| 8,342,350 B2 * | 1/2013 | Jain | 220/23.89 |
| 2003/0080128 A1 * | 5/2003 | Brodner et al. | 220/23.87 |
| 2003/0090959 A1 * | 5/2003 | Mayer | 366/197 |
| 2006/0044935 A1 * | 3/2006 | Benelli et al. | 366/145 |
| 2006/0261065 A1 * | 11/2006 | Claypool et al. | 220/212 |
| 2009/0045194 A1 * | 2/2009 | Rhee | 220/23.89 |
| 2012/0138608 A1 * | 6/2012 | Rusnak et al. | 220/23.87 |

FOREIGN PATENT DOCUMENTS

| | | | | |
|---|---|---|---|---|
| GB | 2319951 A | | 12/2011 | |
| KR | 443559 Y1 | | 4/2008 | |
| WO | WO 80/01483 | * | 7/1980 | B65D 90/04 |
| WO | WO8001483 | * | 7/1980 | B65D 90/04 |

* cited by examiner

MIXING BOWL LINER AND LID

CROSS REFERENCE TO RELATED APPLICATIONS

The present application claims the benefit, under 35 U.S.C. §119(e), of U.S. Provisional Application No. 61/427,964 which was filed Dec. 29, 2010 and which is hereby incorporated by reference herein.

TECHNICAL FIELD

The present disclosure relates generally to accessories for use with a stand mixer appliance. The present disclosure relates more particularly to a mixing bowl liner for a stand mixer.

BACKGROUND

A portable appliance, or small appliance, such as a stand mixer, is a device that may be used in the preparation of meals and other foodstuffs. Typically, stand mixers are intended to be used on tabletops, countertops, or other platforms. Stand mixers are used with a variety of accessories including mixing elements such as beaters, dough hooks, and whisks and mixing bowls such as metallic bowls, polymer bowls, and thermally insulated bowls.

SUMMARY

According to one aspect of the disclosure, a bowl liner for a mixing bowl of a stand mixer is disclosed. The bowl liner includes a shell and a rim. The shell is sized to be received in the mixing bowl. The shell is formed from an elastomeric material and has a mixing chamber defined therein. The rim is secured to an upper end of the shell and includes an outer perimeter surface having a keyed surface section to locate the liner relative to the stand mixer.

In some embodiments, the keyed surface section may include a notch defined in the outer perimeter surface, and the notch may be sized to receive a portion of the stand mixer. In some embodiments, the outer perimeter surface may include a curved surface and the keyed surface section may include a flat surface.

In some embodiments, the rim may include a first annular flange and a second annular flange. The first annular flange may have a first wall that extends outwardly from the shell and a second wall that extends downwardly from the first wall. The second annular flange may extend outwardly from a lower end of the second wall of the first annular flange to the outer perimeter surface.

In some embodiments, the first wall and the second wall of the first annular flange may define a downwardly-facing slot that is sized to receive an upper rim of the mixing bowl. The first annular flange may include a plurality of tabs extending from an inner surface of the second wall toward an outer surface of the shell. The second annular flange may include a substantially planar platform and a plurality of arcuate ribs extending downwardly from the platform.

In some embodiments, the bowl liner may include a lid secured to the rim. The lid may include a plate extending over the mixing chamber and a circular bore extending through the plate. The lid may include a door pivotally coupled to the plate. The door may be moveable between a closed position in which access to the mixing chamber is prevented and an open position in which access to the mixing chamber is permitted.

In some embodiments, the shell may include a base and a frustoconical-shaped side wall. The frustoconical-shaped side wall may connect the base and the rim.

According to another aspect, a bowl liner assembly for a mixing bowl of a stand mixer is disclosed. The bowl liner assembly includes a bowl liner and a plurality of interchangeable lids configured to be separately secured to the bowl liner. The bowl liner includes a shell and a rim. The shell is sized to be received in the mixing bowl. The shell is formed from an elastomeric material and has a mixing chamber defined therein. The rim is secured to an upper end of the shell and includes an outer perimeter surface having a keyed surface section to locate the liner relative to the stand mixer. The rim also includes a first flange that has a first wall, a second wall, and a plurality of tabs. The first wall extends outwardly from the top end of the shell. The second wall is spaced apart from the shell and extends downwardly from the first wall to form a downwardly-facing slot. The plurality of tabs extends from an inner surface of the second wall toward an outer surface of the shell.

In some embodiments, the rim may include a substantially planar platform and a plurality of ribs extending downwardly from the platform. In some embodiments, the bowl liner may include at least a first bowl liner and a second bowl liner. The first bowl liner may be stacked with the second bowl liner such that the shell of the first bowl liner is received in a mixing chamber of the second liner. The ribs of the first bowl liner may contact an upper surface of a platform of a rim of the second bowl liner.

In some embodiments, the rim of the bowl liner may include a second flange extending outwardly from the second wall of the first flange and may be formed to include the keyed surface section. Additionally, in some embodiments, the plurality of interchangeable lids may include a lid. The lid may include a cover and a working rim. The cover may have a circular bore defined therein. The rim may extend around the cover and may be configured to be coupled to the rim of the bowl liner.

In some embodiments, the plurality of interchangeable lids may include a second lid. The second lid may include a cover and a rim. The cover may be configured to enclose the mixing chamber when the second lid is coupled to the bowl liner. The rim may extend around the cover and may be configured to be coupled to the rim of the bowl liner.

According to another aspect, a stand mixer is disclosed. The stand mixer includes a base, a mixer head positioned above the base, a pedestal extending upwardly from the base and supporting the mixer head, a mixing element extending downwardly from the mixer head, and a mixing bowl positioned under the mixer head. The mixing bowl includes an upper rim and an inner surface extending downwardly from the upper rim to define a bowl chamber. The stand mixer also includes a bowl liner positioned in the bowl chamber of the mixing bowl. The bowl liner includes a liner base in contact with the inner surface of the mixing bowl, a liner rim positioned above the base, and a frustoconical-shaped side wall connecting the base and the liner rim. A first section of the frustoconical-shaped side wall is spaced apart from the inner surface of the mixing bowl. The mixing element is configured to engage the first section of the frustoconical-shaped side wall to advance the first section into contact with the inner surface of the mixing bowl. Engagement of the frustoconical-shaped sidewall by the mixing element results in less food build up on the bowl liner increasing ingredient incorporation. Increased incorporation of ingredients may enhance mixing of relatively small volumes of ingredients mixed in larger bowls.

In some embodiments, the liner may be formed from semi-transparent polypropylene. In some embodiments, the liner rim may include an outer perimeter surface having a keyed surface section to locate the liner relative to the base of the stand mixer. In some embodiments, the stand mixer may further include a lid coupled to the liner rim, wherein the mixing element extends through a bore formed through the lid.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
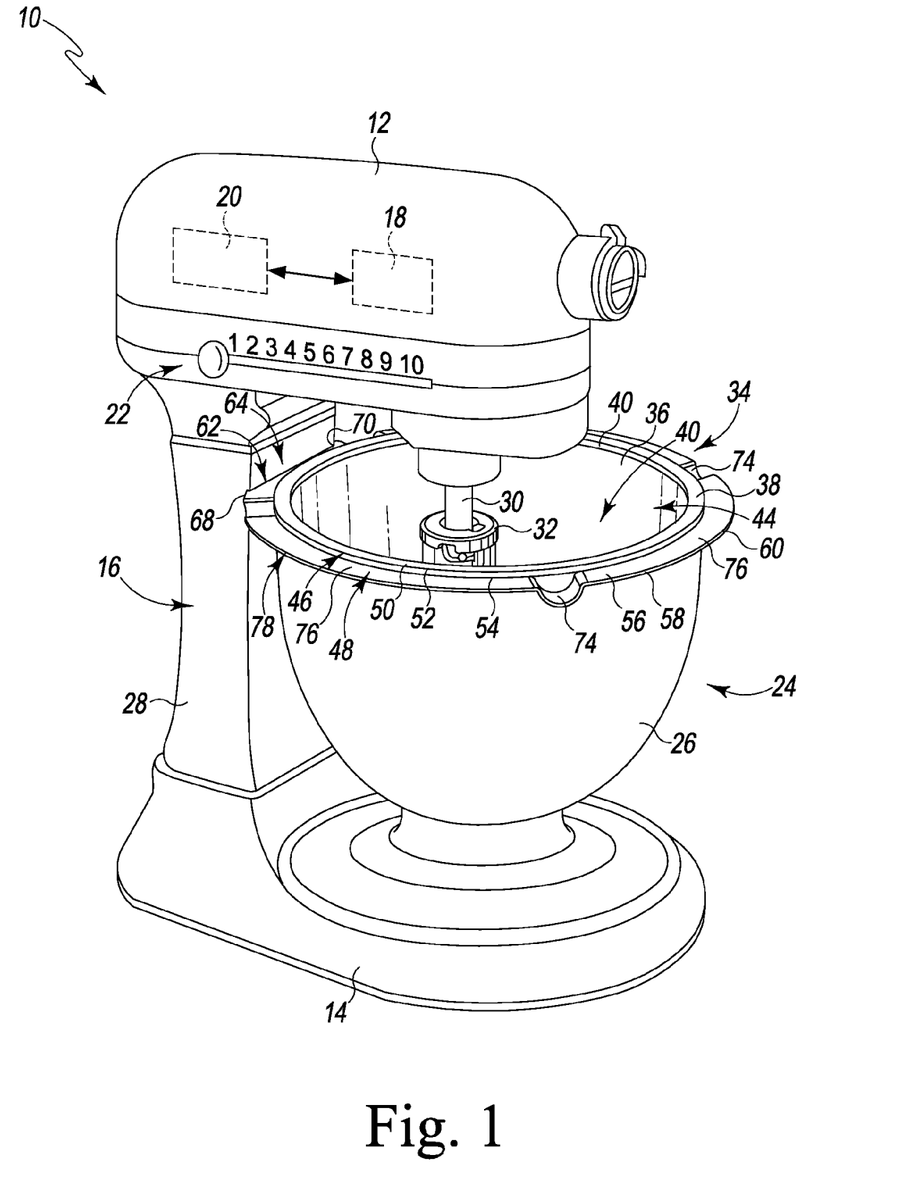
FIG. 1 is a perspective view of one embodiment of a bowl liner positioned in a mixing bowl of a stand mixer.

Referring to FIG. 1, a stand mixer appliance 10 (hereinafter "stand mixer") is shown. The stand mixer 10 has a mixer head 12, a base 14, and an upstanding pedestal 16 extending upwardly from the base 14. The upstanding pedestal 16 supports the mixer head 12, which encases a motor 18 and associated electronic motor controls 20. In some embodiments, the motor 18 and/or the motor controls 20 may be alternatively located in any part of the base 14, including the upstanding pedestal 16. As shown in FIG. 1, the stand mixer 10 is a bowl-lift stand mixer, such as, for example, the KP26 Stand Mixer available from KitchenAid® of St. Joseph, Mich. In other embodiments, the stand mixer may be, for example, a tilt-head stand mixer such as the KSM154 Stand Mixer available from KitchenAid® of St. Joseph, Mich.

A user control 22 is also included on the stand mixer 10. The user control 22 is illustratively embodied in FIG. 1 as a sliding speed control knob 22 mounted in the mixer head 12. The user may choose a desired speed setting with the control knob 22, and the motor controls 20 will generally attempt to operate the motor 18 at the desired speed. As shown in FIG. 1, the sliding speed control knob 22 is configured for multiple discrete speeds, indexed from 0 to 10 in increments of 1. It will be appreciated that in other embodiments the user control 22 may be any type of analog or digital user interface operable to input a desired speed setting for the stand mixer 10.

The stand mixer 10 includes a mixing bowl 24 having a curved side wall 26. The illustrative mixing bowl 24 is made from stainless steel. In other embodiments, materials such as glass or plastic may be used in the mixing bowl 24. The mixing bowl 24 is supported on the base 14 and is positioned below the mixer head 12. The upstanding pedestal 16 of the stand mixer 10 has a pedestal body 28, and the side wall 26 of the mixing bowl 24 is spaced apart from the pedestal body 28. A drive shaft 30 extends downwardly from the mixer head 12, and a mixing element 32 is releasably coupled to the drive shaft 30 for rotation thereby.

As shown in FIG. 1, the mixing bowl 24 has a mixing bowl liner 34 positioned therein such that the liner 34 is positioned below the drive shaft 30 of the stand mixer 10. The liner 34 has a shell 36 and a rim 38 extending outwardly from an upper edge 40 of the shell 36. The shell 36 of the liner 34 has a mixing chamber 42 defined therein into which foodstuffs or other items can be placed to be mixed together. The upper edge 40 of the shell 36 defines an upward-facing opening 44 of the mixing chamber 42 to permit access to the mixing chamber 42. As shown in FIG. 1, the mixing element 32 of the stand mixer 10 is positioned in the mixing chamber 42 of the liner 34 to mix foodstuffs and other items in the mixing chamber 42 of the liner 34.

The rim 38 of the liner 34 includes an annular inner flange 46 and an annular outer flange 48 that extends outwardly from the inner flange 46. In some embodiments, the rim 38 may also include a side wall that extends downwardly from the outer flange 48. The inner flange 46 of the rim 38 includes an upper wall 50 that extends outwardly from the upper edge 40 of the shell 36 of the liner 34. The inner flange 46 also has a side wall 52 that extends downwardly from the upper wall 50. The upper wall 50 and the side wall 52 cooperate with the shell 36 to form a downward-facing slot 54 that is sized to receive the rim 162 of the mixing bowl 24 (see FIG. 3). The slot 54 is circular and extends around the upper edge 40 of the liner shell 36.

Figure 2:
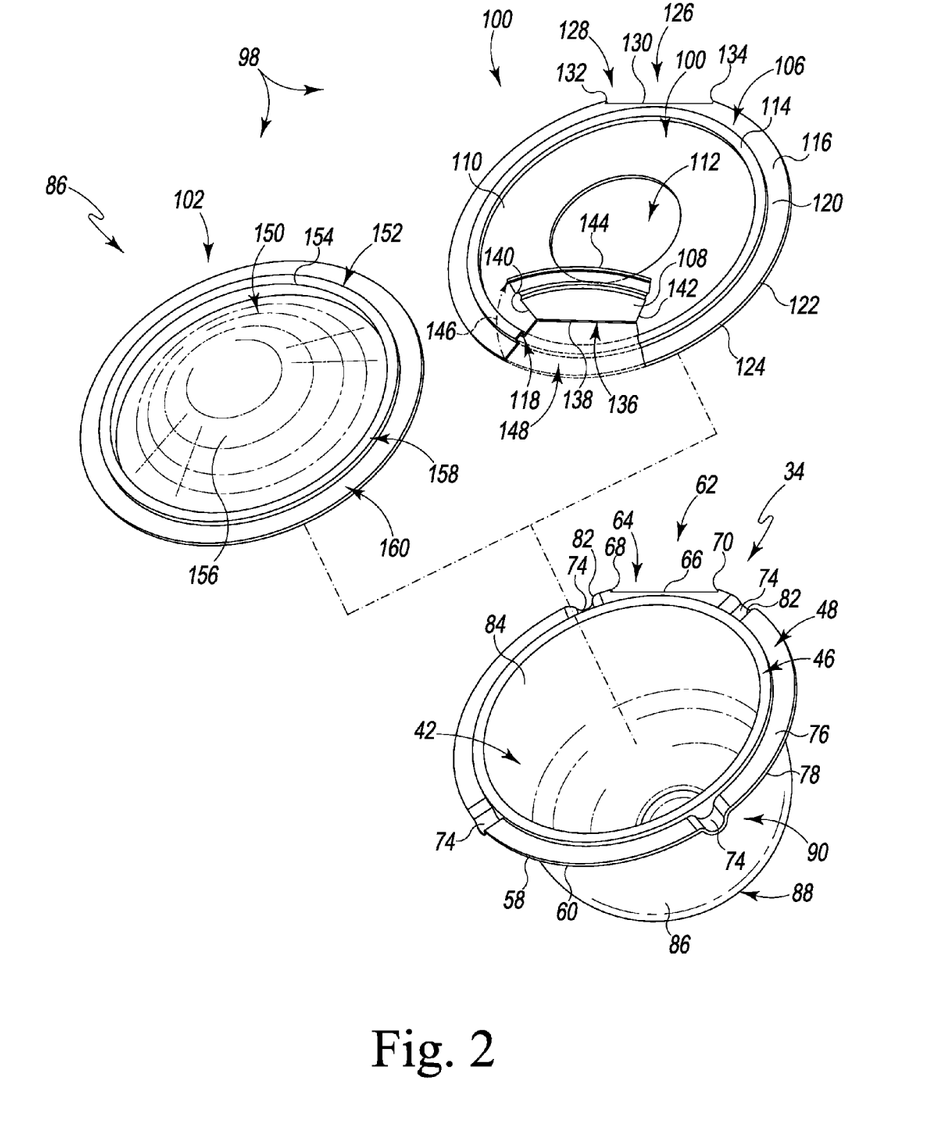
FIG. 2 is an exploded perspective view of the bowl liner of FIG. 1 with a pair of interchangeable liner lids.

As shown in FIGS. 1 and 2, the outer flange 48 of the rim 38 includes a platform 56 that extends outwardly from the lower end of the side wall 52 of the inner flange 46 to an outer perimeter surface 58 of the rim 38. The outer perimeter surface 58 includes a curved surface section 60 and a keyed surface section 62. The keyed surface section 62 is configured to locate the liner 34 and to inhibit rotational movement of the liner 34 relative to the stand mixer 10, as described in greater detail below.

In the illustrative embodiment, the keyed surface section 62 has a notch 64 defined therein, and a substantially planar or flat surface 66 extends from an edge 68 of the notch 64 to another edge 70 of the notch 64. The pedestal body 28 is sized to be received in the notch 64 such that the liner 34 is properly positioned relative to the base 14 of the stand mixer 10. That is, the notch 64 of the flange 48 engages the pedestal body 28 of the upstanding pedestal 16 when the liner 34 is positioned in the mixing bowl 24, as shown in FIG. 1. Additionally, the engagement of the notch 64 with the upstanding pedestal 16 inhibits rotation of the liner 34 relative to the stand mixer 10. In other embodiments, the keyed surface section 62 of the outer perimeter surface 58 may include only a substantially planar or flat surface and may omit the notch 64. In such embodiments, the flat surface may engage the upstanding pedestal 16 to locate the liner 34 and inhibit rotation of the liner 34 relative to the stand mixer 10.

The platform 56 of the outer flange 48 also has a plurality of ribs 74 spaced circumferentially around the upper edge 40 of the shell 36. Between the ribs 74, the platform 56 includes a substantially planar top surface 76 and a substantially planar bottom surface 78 positioned opposite the top surface 76. As shown in FIG. 1, the notch 64 of the flange 48 is formed between a pair of ribs 82. Each of the ribs 74 has a downwardly-extending, arcuate profile. In other embodiments, the ribs 74 may be formed in different shapes. In still other embodiments, the flange 48 may be formed without the ribs 74.

Figure 3:
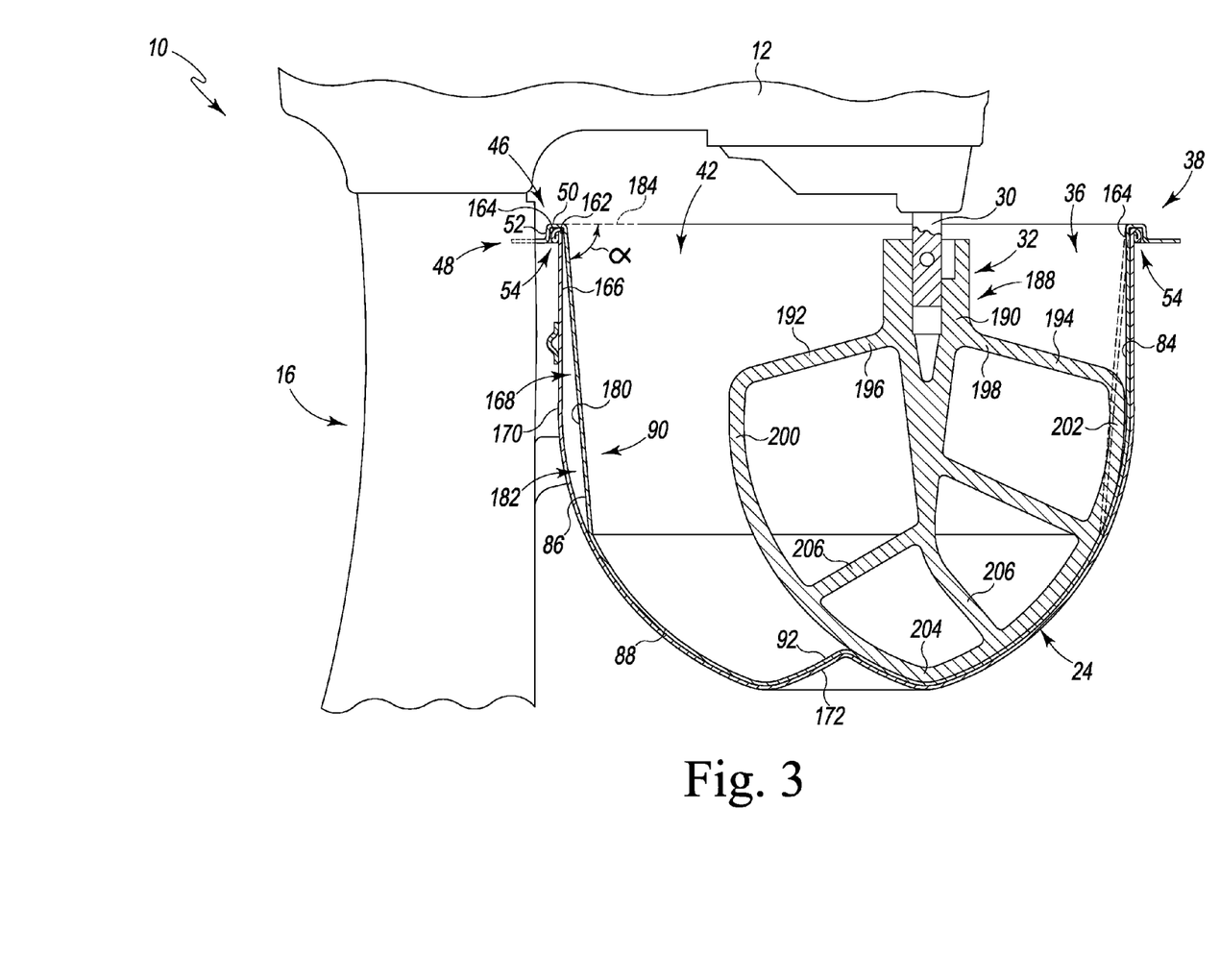
FIG. 3 is a cross-sectional view of the stand mixer of FIG. 1.

Referring now to FIGS. 2 and 3, the shell 36 of the liner 34 has an inner surface 84 that defines the mixing chamber 42 and an outer surface 86 positioned opposite the inner surface 84. The shell 36 of the liner 34 also includes a base 88 and a frustoconically-shaped side wall 90 extending upwardly from the base 88 to the upper edge 40 of the shell 36. In that way, the side wall 90 connects the base 88 to the rim 38. As shown in FIG. 3, the base 88 of the shell 36 has a convex indentation 92 that extends upwardly toward the rim 38 of the liner 34. The base 88 and the side wall 90 are molded to support the weight of the liner 34 when the liner 34 is positioned on a table or other surface. It should be appreciated that in other embodiments the base 88 of the shell 36 may be made from a deformable material such that the base 88 is collapsible when placed on a table or other surface.

The liner 34 is formed from an elastomeric material such as, for example, semi-transparent polypropylene. In other embodiments, other materials such as a polypropylene blend or other elastomeric materials may be used in construction of the liner 34. Additionally, in other embodiments, the liner 34 may be made in other desired colors such as black, white, and other suitable colors.

The liner 34 is shown with a plurality of interchangeable liner lids 98 in FIG. 2. The term "interchangeable liner lid" is defined is defined herein as a lid configured to be separately secured to the bowl liner 34. Examples of interchangeable liner lids include working lids, such as, for example, a working lid 100, which is configured to be used during the mixing process, and storage lids, such as a storage lid 102, which is configured to enclose or seal the mixing chamber 42 of the liner 34.

The illustrative working lid 100 shown in FIG. 2 is made from polystyrene for one-time use. In other embodiments, other suitable materials such as polypropylene, polypropylene blends, or other plastics may be used in the working lid 100. The working lid 100 includes a cover 104, a rim 106 extending around the cover 104, and a door 108 secured to the cover 104. The cover 104 has a plate 110 and a circular bore 112 defined therein. The bore 112 of the working lid 100 is sized to permit the drive shaft 30 and the mixing element 32 of the stand mixer 10 to pass therethrough. When the drive shaft 30 of the stand mixer 10 is moved by the motor 18 during operation, the bore 112 is sized to permit the drive shaft 30 to move in a complex pattern to mix foodstuffs and other items in the liner 34 while the working lid 100 is attached. It should be appreciated that in other embodiments the bore 112 may be square, rectangular, or another geometric shape sized to permit movement of the drive shaft 30 and the mixing element 32 during operation.

The rim 106 of the working lid 100 includes an annular inner flange 114 that extends outwardly from the cover 104 and an annular outer flange 116 that is attached to the inner flange 114. The inner flange 114 has a downwardly-facing U-shaped channel 118 defined therein, and the channel 118 is sized to receive the inner flange 46 of the rim 38 of the liner 34 such that the inner flange 114 of the working lid 100 is clamped on to the inner flange 46 of the liner 34. In that way, the working lid 100 may be coupled to the liner 34.

As shown in FIG. 2, the annular outer flange 116 of the rim 106 includes a platform 120 that extends outwardly from the inner flange 114 to an outer perimeter surface 122 of the rim 106. The outer perimeter surface 122 includes a curved surface section 124 and a keyed surface section 126. The keyed surface section 126 is configured to be aligned with the keyed surface section 62 of the liner 34. Like the keyed surface section 62 of the liner 34, the keyed surface section 126 has a notch 128 defined therein. A flat surface 130 extends from an edge 132 of the notch 128 to another edge 134 of the notch 128. The notch 128 is sized to receive the upstanding pedestal 16 of the stand mixer 10 when the liner 34, the working lid 100, and the mixing bowl 24 are positioned on the base 14. In that position, the notch 128 of the working lid 100 engages the pedestal body 28 of the upstanding pedestal 16. The engagement of the working lid 100 with the upstanding pedestal 16 inhibits rotation of the working lid 100 relative to the stand mixer 10. In other embodiments, the keyed surface section 126 of the working lid 100 may include only a flat surface and may omit the notch 128. In such embodiments, the flat surface may engage the upstanding pedestal 16 to inhibit rotation of the liner 34 relative to the stand mixer 10.

As described above, the working lid 100 includes a door 108 that is secured to the cover 104. The door 108 is operable to permit additional user access to the mixing chamber 42 of the liner 34 when the working lid 100 is secured thereto. The door 108 is secured to the cover 104 via a hinge 136. In the illustrative embodiment, the hinge 136 is a living hinge including a thinned plastic section 138 that is formed in the cover 104. The door 108 is also attached to the cover 104 via a pair of perforated edges 140, 142 that are spaced apart and extend inwardly from the outer perimeter surface 122 of the rim 106 to the living hinge 136.

To open the door 108, a user grasps an outer edge 144 of the door 108 to lift the door 108, thereby tearing the pair of perforated edges 140, 142 and pivoting the door 108 about the living hinge 136, as indicated by arrow 146. When the door 108 is open as shown in FIG. 2, the edges 140, 142 and the living hinge 136 define an opening 148 through which a user can add ingredients or other materials into the mixing chamber while the mixing element 32 is moved by the motor 18 of the stand mixer 10. It should be appreciated that in other embodiments the door may be removable from the lid 100.

As described above, the interchangeable lids 98 include the storage lid 102, which is configured to enclose the mixing chamber 42 of the liner 34 when secured thereto. The illustrative storage lid 102 is made from polypropylene. In other embodiments, other suitable materials including polypropylene blends and other plastics may be used in the storage lid 102. The storage lid 102 includes a cover 150 and a rim 152 attached to the outer perimeter 154 of the cover 150. The cover 150 is sized to extend over the opening 44 of the mixing chamber 42 when the storage lid 102 is coupled to the liner 34. The cover 150 has a convex upper surface 156 such that when the storage lid 102 is coupled to the liner 34, the convex upper surface 156 of the cover 150 may be depressed to evacuate excess air from the mixing chamber 42.

The rim 152 of the storage lid 102 includes an annular inner flange 158 and an annular outer flange 160 that extends outwardly from the annular inner flange 158. The inner flange 158 is attached to the cover 150 and forms a downwardly facing channel (not shown) similar to the downwardly-facing U-shaped channel 118 of the working lid 100. The channel of the storage lid 102 is sized to receive the inner flange 46 of the liner 34 such that the inner flange 158 of the storage lid 102 clamps on to the inner flange 46 of the liner 34. In that way, the storage lid 102 may be coupled to the liner 34.

Referring now to FIG. 3, the mixing bowl 24 and bowl liner 34 are shown positioned on the stand mixer 10. As described above, the mixing bowl 24 has a rim 162 extending around an upper edge 164 of the mixing bowl 24. The side wall 26 of the mixing bowl 24 has an inner surface 166, which extends downwardly from the rim 162 to define an inner chamber 168 of the mixing bowl 24, and an outer surface 170 positioned opposite inner surface 166. The side wall 26 of the mixing bowl 24 has a convex indentation 172 that extends upwardly toward the rim 162 of the mixing bowl 24.

As shown in FIG. 3, the shell 36 of the liner 34 is received in the chamber 168 of the mixing bowl 24. The base 88 of the shell 36 is pre-molded to conform to a bottom surface section 176 of the inner surface 166 of the mixing bowl 24. When the liner 34 is positioned in the mixing bowl 24, the outer surface 86 of the liner 34 contacts the inner surface 166 of the mixing bowl 24 along the base 88 of the liner 34 such that the base 88 of the shell 36 conforms with and engages the side wall 26 of the mixing bowl 24. The slot 54 defined in the inner flange 46 of the liner 34 receives the rim 162 of the mixing bowl 24 such that the inner flange 46 clamps onto the rim 162 to couple the liner 34 to the mixing bowl 24.

As shown in FIG. 3, the side wall 90 of the shell 36 extends from the base 88 of the liner 34 to the upper edge 40 of the liner 34. As shown in FIG. 3, the outer surface 86 of the liner 34 is spaced apart from the inner surface 166 of the mixing bowl 24 along a side wall section 180 of the liner 34. In that way, the side wall section 180 of the liner 34 does not contact the side wall 26 of the mixing bowl 24, and a gap 182 is defined between the side wall section 180 and the side wall 26 of the mixing bowl 24.

An imaginary plane 184 is defined by the upper surface 186 of the upper wall 50 of the flange 46. An angle α is defined between the side wall 90 of the shell 36 and the imaginary plane 184. In the illustrative embodiment, the magnitude of the angle α is about 85 degrees. It should be appreciated that in other embodiments the magnitude of the angle α may be between 77 and 89 degrees. In other embodiments, the magnitude of the angle α may be another suitable angle. The size of the gap 182 formed between the side wall section 180 of the liner 34 may be increased by reducing the magnitude of the angle α or decreased by increasing the magnitude of the angle α.

As described above, the stand mixer 10 includes a mixing element 32. In the illustrative embodiment, the mixing element 32 is embodied as a mixing beater 188. It should be appreciated that in other embodiments the mixing element 32 may be a wire whip, a flat beater, dough hook, or the like. The beater 188 has a stem 190 coupled to the drive shaft 30 and a pair of arms 192, 194 extending oppositely away from the stem 176. The arm 192 is secured to the stem 190 at an end 196 and the arm 194 is secured to the stem 176 at an end 198. The arms 192, 194 include curved branches 200, 202, respectively, that curve downwardly to meet at a tip 204. The beater 188 also includes a number of support branches 206 that extend outwardly from the stem 190 and connect to the arms 192, 194 at various points to support the arms 192, 194.

The curved branches 200, 202 of the beater 188 are shaped to conform with the inner surface 166 of the mixing bowl 24. Further, the curved branches 200, 202 are sized so that the branches 200, 202 engage the inner surface 84 of the liner 34 at different points as the beater 188 is moved during mixing around the mixing chamber 42. When the curved branches 200, 202 of the beater 188 engage the inner surface 84 of the liner 34, as shown on the right side of FIG. 3, the side wall 90 of the liner 34 is moved outwardly from a disengaged position (shown in broken line) in which the side wall section 180 of the liner 34 is spaced apart from the side wall 26 of the mixing bowl 24 to an engaged position in which the side wall 90 of the liner 34 conforms with and engages the side wall 26 of the mixing bowl 24. When the curved branches 200, 202 move out engagement with the inner surface 84 of the liner 34, the side wall 90 of the liner 34 moves from the engaged position back to the disengaged position, as shown on the left side of FIG. 3. In that way, the side wall 90 of the liner 34 is flexibly resilient such that the side wall 90 may be moved from the disengaged position to the engaged position when force is applied thereto and may substantially return to the disengaged position when force is removed from the side wall 90.

During operation, foodstuffs and other materials stuck to the liner 34 may be dislodged from the side wall 90 and incorporated into a mixture contained in the mixing chamber 42 when the curved branches 200, 202 of the beater 188 push the side wall section 180 into contact with the side wall 26 of the mixing bowl 24. In other embodiments, the beater 188 may move a portion of the side wall 90 of the liner 34 closer to the side wall 26 of the mixing bowl 24 without causing contact between that portion of side wall 90 of the liner 34 and the side wall 26 of the mixing bowl 24.

Figure 4:
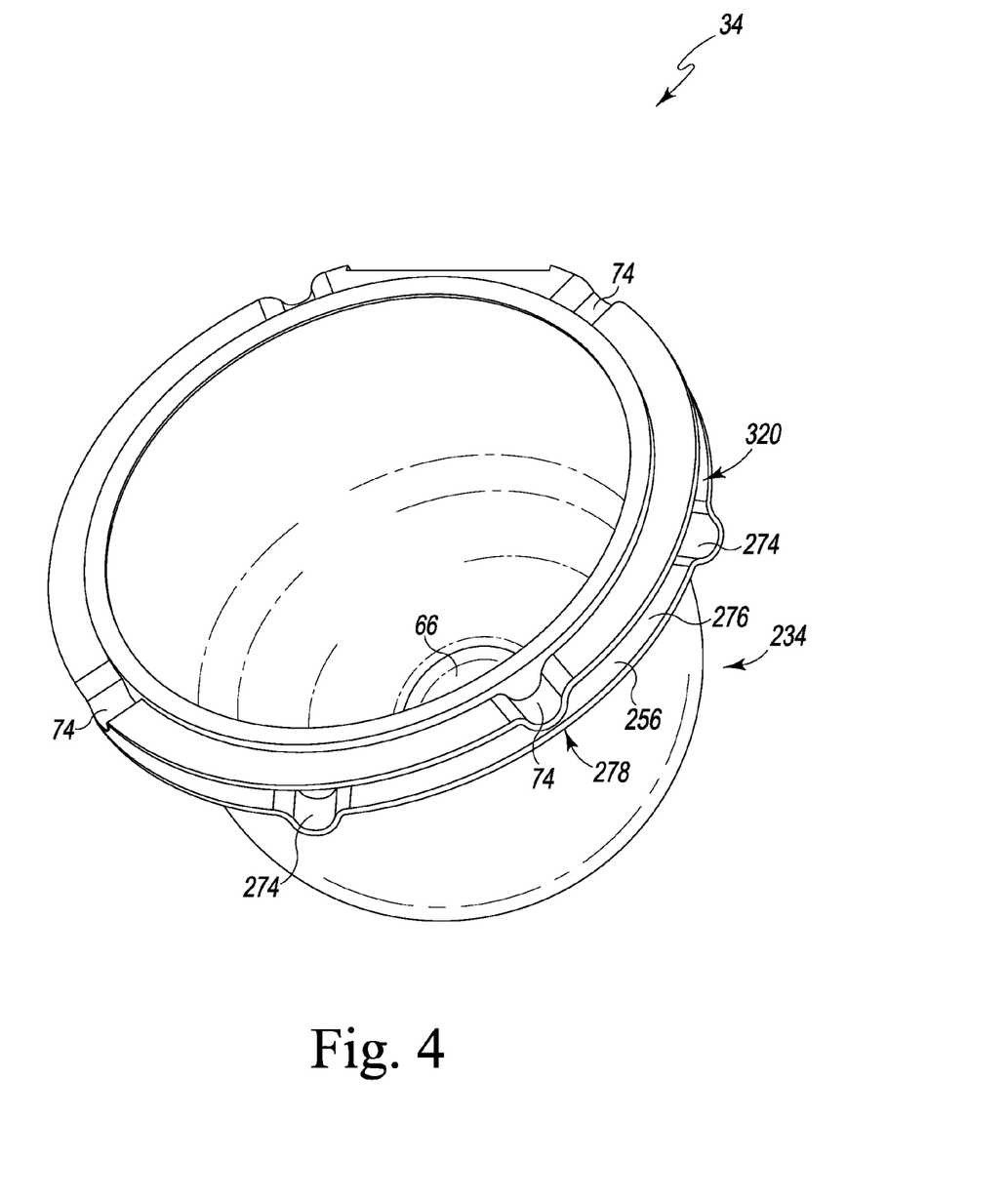
FIG. 4 is a perspective view of the bowl liner with FIG. 1 stacked with another bowl liner.
Figure 5:
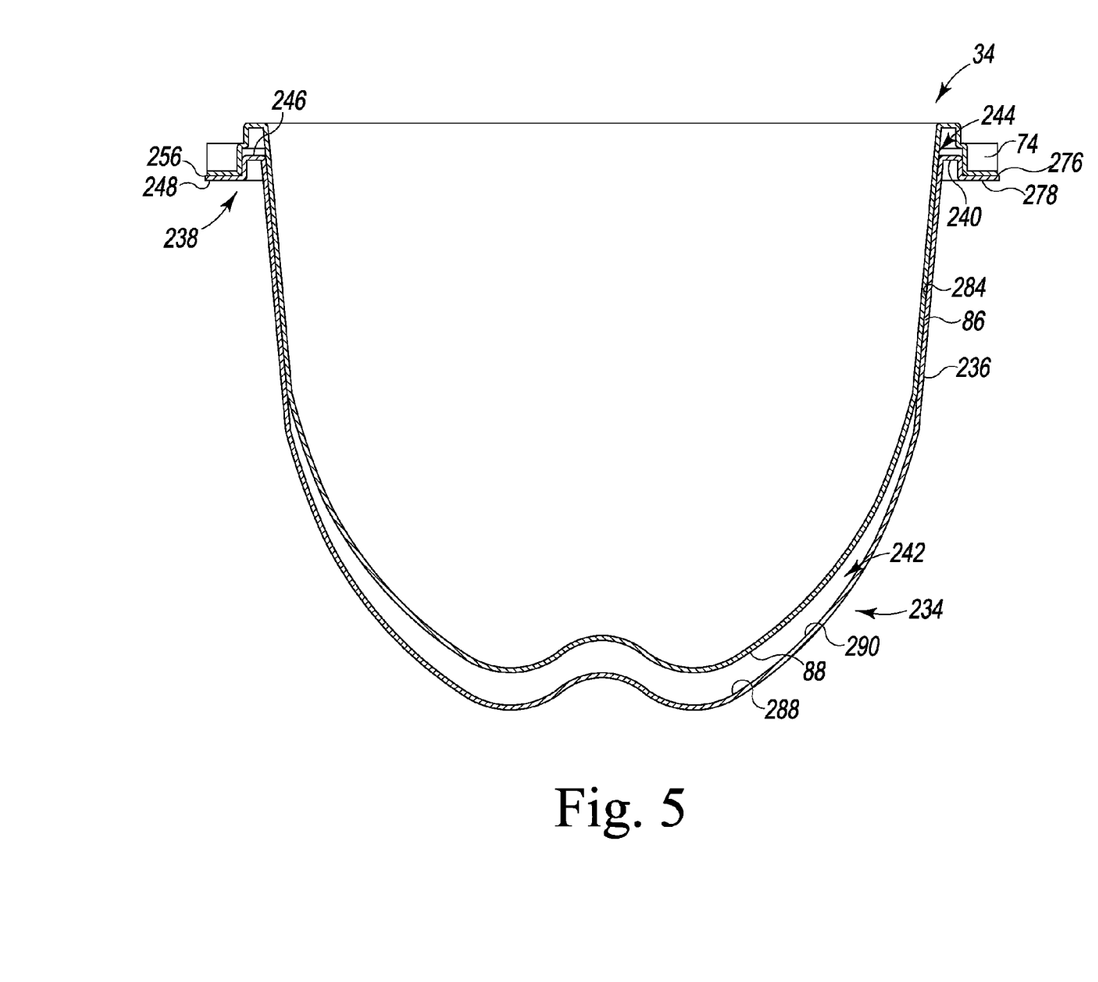
FIG. 5 is a cross-sectional view of the pair of bowl liners of FIG. 4.

Referring now to FIGS. 4 and 5, the liner 34 is shown stacked in another liner 234. The liner 234 has a shell 236 and a rim 238 extending outwardly from an upper edge 240 of the shell 236. The shell 236 of the liner 234 has a mixing chamber 242 defined therein into which foodstuffs or other items can be placed to be mixed together. The upper edge 240 of the shell 236 defines an upward-facing opening 244 of the mixing chamber 242 to permit access to the mixing chamber 242.

The rim 238 of the liner 234 includes an annular inner flange 246 and an annular outer flange 248 extending outwardly from the inner flange 246. The outer flange 248 of the rim 238 includes a platform 256 that extends outwardly from the lower end of the side wall 252 of the inner flange 246 to an outer perimeter surface 258 of the rim 238. The platform 256 of the outer flange 248 also has a plurality of downwardly-extending ribs 274 spaced circumferentially around the upper edge 240 of the shell 236. Between the ribs 274, the platform 256 includes a planar top surface 276 and a planar bottom surface 278 positioned opposite the top surface 276.

As shown in FIG. 5, the liner 34 is positioned in mixing chamber 242 of the liner 234 such that the outer surface 86 of the side wall 290 of the liner 234 contacts an inner surface 284 of the side wall 290 of the liner 234. The base 88 of the liner 34 is spaced apart from the base 288 of the other liner 234. As shown in FIG. 4, each of the downwardly-extending ribs 74 of the liner 34 contacts the planar top surface 276 of the platform 256 of the bowl liner 234 such that a stacking space 320 is defined between the bottom surface 78 of the liner 34 and the top surface 276 of the liner 234. The stacking space 320 in the illustrative embodiment is about one-half of an inch to provide space for a user to lift up on the bottom surface 78 of the liner 34. In other embodiments, the stacking space 320 may be smaller or larger than one-half of an inch. As shown in FIG. 4, the ribs 74 of the liner 34 are clocked out of alignment with the ribs 274 of the liner 234. Additional liners may be stacked with the liners 34, 234 as described above to produce an assembly of liners suitable for differently sized storage spaces or displays.

Figures 6, 7:
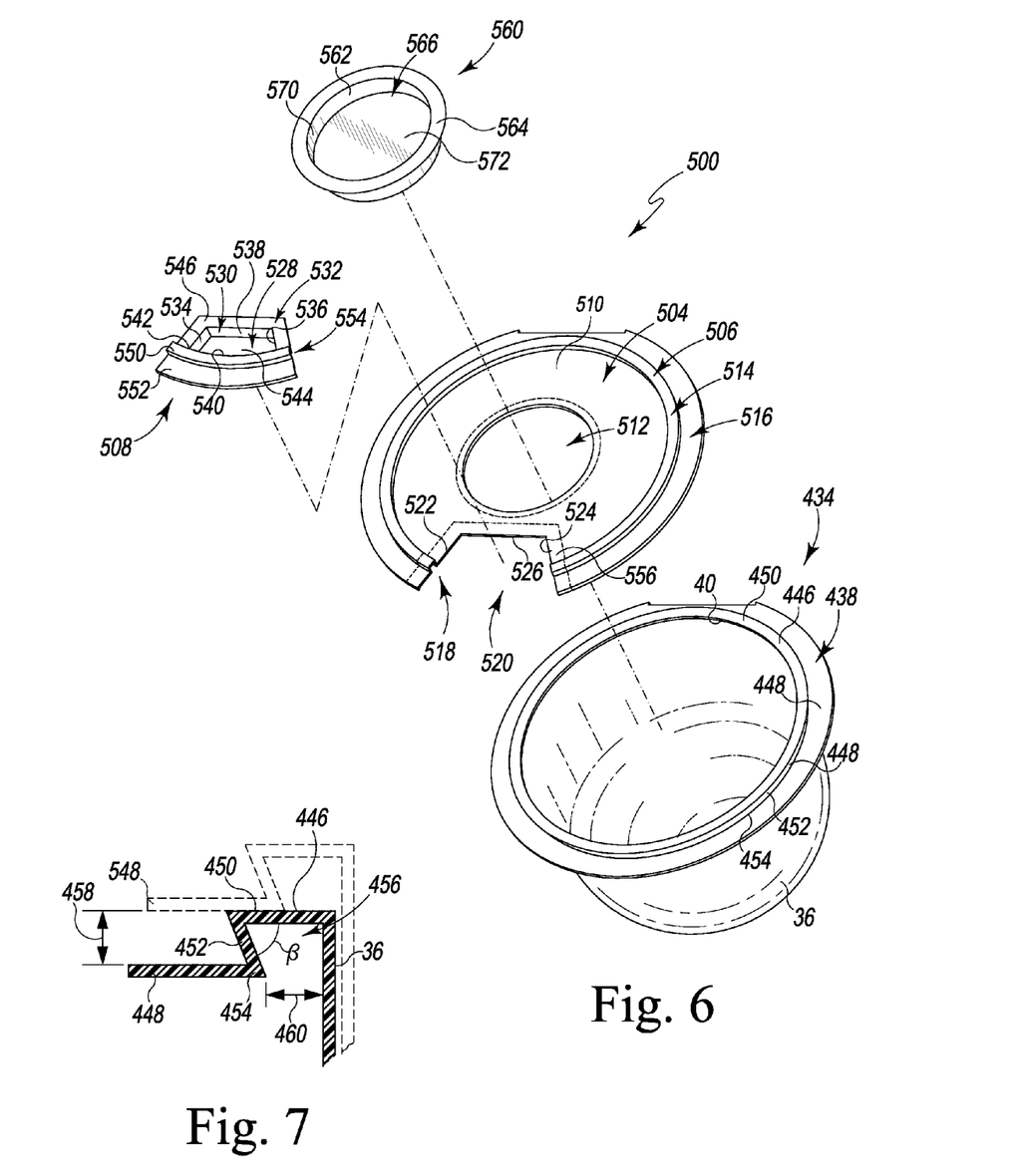
FIG. 6 is an exploded perspective view of another embodiment of a bowl liner with another embodiment of an interchangeable liner lid.
FIG. 7 is a cross-sectional view of the rim of the bowl liner of FIG. 6 taken along the line 7-7.

Referring now to FIGS. 6 and 7, another embodiment of a mixing bowl liner (hereinafter bowl liner 434) and another embodiment of an interchangeable lid (hereinafter combination lid 500) are illustrated. Some features of the embodiments illustrated in FIGS. 6 and 7 are substantially similar to those discussed above in reference to the embodiment of FIGS. 1-4. Such features are designated in FIGS. 6 and 7 with the same reference numbers as those used in FIGS. 1-4.

The liner 434 includes a shell 36 and a rim 438 extending outwardly from an upper edge 40 of the shell 36. The rim 438 of the liner 434 includes an annular inner flange 446 and an annular outer flange 448 extending outwardly from the inner flange 446. Like the inner flange 46 of the liner 34, the inner flange 446 of the liner 434 is configured to clamp on to the rim 162 of the mixing bowl 24 to couple the liner 434 to the mixing bowl 24.

The flange 446 of the rim 438 includes an upper wall 450 that extends outwardly from the upper edge 40 of the shell 36 of the liner 434. The flange 446 also has a side wall 452 that extends downwardly from the upper wall 450, and the annular outer flange 448 extends outwardly from a bottom end 454 of the side wall 452. The upper wall 450 and the side wall 452 cooperate with the shell 436 to form a downward-facing slot 456 that is sized to receive the rim 162 of the mixing bowl 24.

As shown in FIG. 7, an angle β is defined between the side wall 452 and the upper wall 450. The magnitude of the angle β is illustratively approximately 83 degrees. In other embodiments, the magnitude of the angle β may be between 80 and 86 degrees. In still other embodiments, the magnitude of the angle β may be less than 90 degrees.

In use, the side wall 452 of the inner flange 446 bends outwardly and the angle β increases to receive the rim 162 of the mixing bowl 24 when the liner 434 is advanced into contact with the mixing bowl 24. When the liner 434 is seated in the mixing bowl 24, the upper wall 450 of the flange 446 is configured to overlie the rim 162 of the mixing bowl 24 and the side wall 452 of the flange 446 returns to the position shown in FIGS. 6 and 7, thereby coupling the liner 434 to the mixing bowl 24.

As shown in FIG. 7, the side wall 452 of the flange 446 has a height 458. The bottom end 454 of the side wall 452 is spaced a distance 460 from an outer surface 86 of the shell 36 of the liner 434. The distance 460 between the outer surface 86 of the shell 36 and the bottom end 454 of the side wall 452 is smaller than the height 458 of the side wall 452. As a result, when the liner 434 is stacked with another liner 434 as shown in FIG. 7, the flange 448 of the liner 434 is spaced apart from a corresponding flange 548 of another liner (shown in broken lines) by a distance 462, which corresponds to the height 458 of the flange 448.

Returning now to FIG. 6, the combination lid 500 is shown with the liner 434. The combination lid 500 includes a cover 504, a rim 506 extending around the cover 504, and a door 508 configured to be attached the cover 504. The cover 504 has a plate 510 and a circular bore 512 defined therein. The bore 512 of the combination lid 500 is sized to permit the drive shaft 30 and the mixing element 32 of the stand mixer 10 to pass therethrough. When the drive shaft 30 of the stand mixer 10 is moved by the motor 18 during operation, the bore 512 is sized to permit the drive shaft 30 to move in a complex pattern to mix foodstuffs and other items in the liner 34 while the combination lid 500 is attached. It should be appreciated that in other embodiments the bore 512 may be square, rectangular, or another geometric shape sized to permit movement of the drive shaft 30 and the mixing element 32 during operation.

The rim 506 of the combination lid 500 includes an annular inner flange 514 that extends outwardly from the cover 504 and an annular outer flange 516 that is attached to the inner flange 514. The flange 514 has a downwardly-facing U-shaped channel 518 defined therein, and the channel 518 is sized to receive the inner flange 446 of the rim 438 of the liner 434. In that way, the combination lid 500 may be coupled to the liner 434.

The lid 500 also includes an opening 520 that is defined in the cover 504. The opening 520 is defined by a pair of edges 522, 524 that extend inwardly from the rim 506 toward the bore 512 to a back edge 526 that is situated between the rim 506 and the bore 512. The opening 520 is sized to allow a user to add ingredients or other materials to the mixing chamber 42 of the liner 434 during the mixing process.

As described above, the combination lid 500 includes a door 508 that is configured to be secured to the cover 504. The door 508 is sized to cover the opening 520 of the lid 500. The door 508 includes a body 530 and a rim 532 extending outwardly from the body 530. In the illustrative embodiment, the body 530 is wedge-shaped and has a well 528 defined therein. The body 530 is formed from a semi-flexible material and is sized to be received in the opening 520 of the lid 500.

The well 528 of the door 508 is defined by a pair of side walls 534, 536, a back wall 538, and a front wall 540 that extend downwardly from an upper surface 542 of the body 530 to a bottom wall 544. The rim 532 includes a cover flange 546 that extends away from the walls 534, 536, 538, and the cover flange 546 is configured to contact an upper surface 556 of the cover 504 near the edges 522, 524, 526 of the opening 520. The side walls 534, 536 form acute angles relative to the cover flange 546 such that the side walls 534, 536 may engage the edges 522, 524 of the cover 502 when the body 530 of the door 508 is positioned in the opening 520. The bottom wall 544 of the door 508 is positioned below the cover 504 of the lid 500 when the door 508 is positioned in the lid 500.

The rim 532 of the door 508 also includes an inner flange 550 extending from the front wall 540 of the body 530 and an outer flange 552 extending outwardly from the inner flange 550. A downwardly-opening channel 554 is defined in the inner flange 550. The channel 554 is U-shaped and is configured to be aligned with the channel 518 of the liner 434. In that way, the channel 554 of the door 508, like the channel 518 of the lid 500, is sized to receive the inner flange 446 of the rim 438 of the liner 434.

The combination lid 500 also includes a storage plug 560 that is sized to be positioned in the bore 512 of the cover 502. As shown in FIG. 6, the plug 560 includes a round body 562 and a flange 564 extending outwardly from the body 562. The flange 564 is configured to contact the upper surface 556 of the cover 502 of the lid 500 when the plug 560 is positioned in the bore 512.

The body 562 of the storage plug 560 is flexible and is sized to be pushed through the bore 512. The body 562 includes a well 566 that is defined by a circular side wall 570 and a bottom wall 572. The side wall 570 of the plug 560 extends downwardly from an upper surface 574 of the body 562 to form an acute angle with the flange 564 such that the side wall 570 may clamped to the cover 502 when the storage plug 560 is positioned in the bore 512. The bottom wall 572 is positioned below the cover 502 of the lid 500 when the storage plug 560 is positioned in the lid 500.

The lid 500 is configured to store foodstuffs and materials in the liner 434 when both the door 508 and the plug 560 are attached to the lid 500 and the lid is attached to the liner 434. The lid 500 may also be used during mixing with at least the plug 560 removed from the bore 512 of the lid 500, which permits the mixing element 32 to pass through the lid 500.

Figure 8:
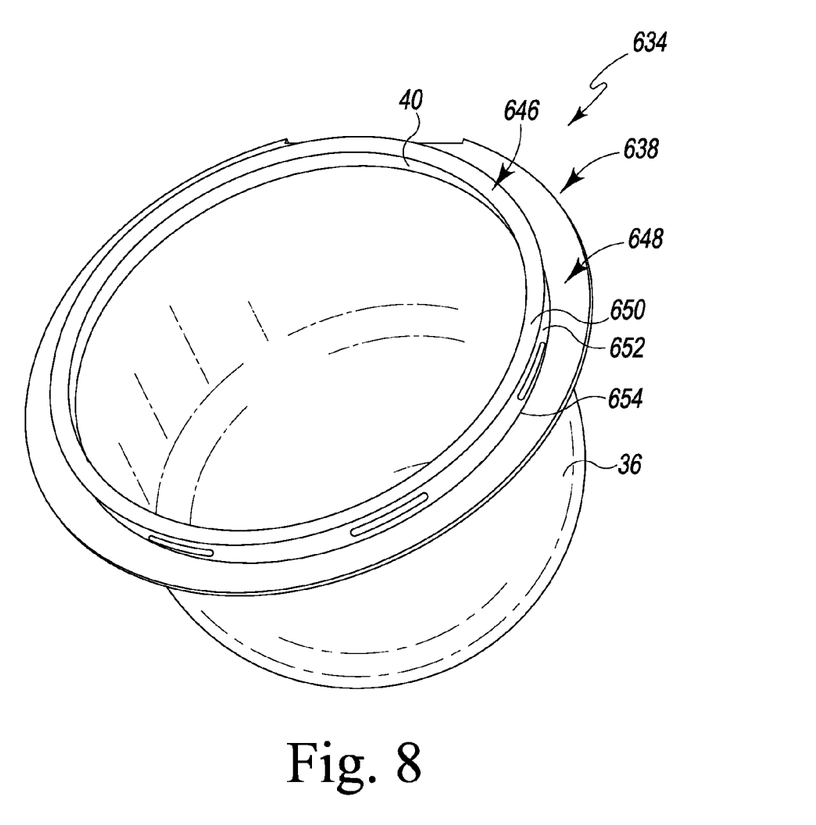
FIG. 8 is a perspective view of another embodiment of a bowl liner.
Figure 9:
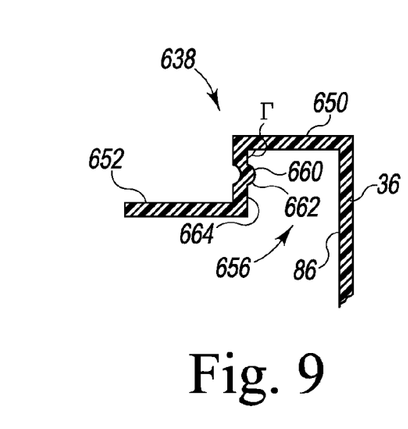
FIG. 9 is a first cross-sectional view of the rim of the bowl liner of FIG. 8 taken along the line 9-9.
Figure 10:
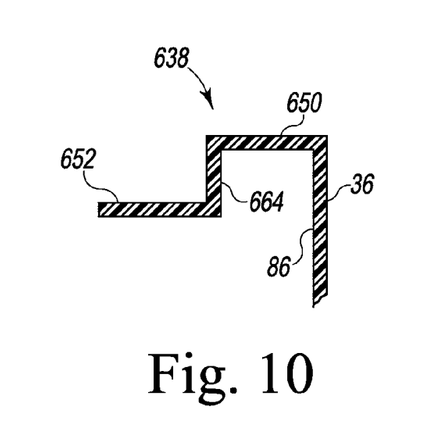
FIG. 10 is a second cross-sectional view of the rim of the bowl liner of FIG. 8 taken along the line 10-10.

Referring now to FIGS. 8-10, another embodiment of a mixing bowl liner (hereinafter bowl liner 634) is illustrated. Some features of the embodiments illustrated in FIGS. 8-10 are substantially similar to those discussed above in reference to the embodiment of FIGS. 1-4. Such features are designated in FIGS. 8-10 with the same reference numbers as those used in FIGS. 1-4.

The bowl liner 634 includes a shell 36 and a rim 638 extending outwardly from an upper edge 40 of the shell 36. The rim 638 of the liner 634 includes an annular inner flange 646 and an annular outer flange 648 extending outwardly from the inner flange 646. Like the inner flange 46 of the liner 34 of FIGS. 1-4, the inner flange 646 of the liner 434 is configured to clamp on to the rim 162 of the mixing bowl 24 to couple the liner 434 to the mixing bowl 24.

The inner flange 646 of the rim 638 includes an upper wall 650 that extends outwardly from the upper edge 40 of the shell 636 of the liner 634. The flange 646 also has a side wall 652 that extends downwardly from the upper wall 650, and the annular outer flange 648 extends outwardly from a bottom end 654 of the side wall 652. The upper wall 650 and the side wall 652 cooperate with the shell 36 to form a downward-facing slot 656 that is sized to receive the rim 162 of the mixing bowl 24, as shown in FIGS. 9 and 10. The side wall 652 of the flange 646 extends downwardly from the upper wall 650 at an angle Γ that is illustratively about 90°. In other embodiments, the angle Γ may be greater or less than 90°.

The rim 638 of the mixing bowl 24 also includes a plurality of tabs 660 that are attached to the side wall 652 and are equally spaced circumferentially around the shell 36 of the liner 634. As shown in FIG. 9, each tab 660 has an arcuate body 662 that extends inwardly from an inner surface 664 of the side wall 652 toward the outer surface 86 of the shell 36. In other embodiments, the plurality of tabs may be a single tab extending partially around or all the way around the shell 36 of the liner 634.

The inner flange 646 of the liner 634 is flexible and is configured to receive and clamp onto the rim 162 of the mixing bowl 24. As the liner 634 is advanced into the mixing bowl 24, the side wall 652 of the inner flange 646 bends outwardly and the angle Γ increases to receive the rim 162 of the mixing bowl 24. When the liner 634 is seated in the mixing bowl 24, the upper wall 650 of the flange 646 is configured to overlie the rim 162 of the mixing bowl 24 and the side wall 652 of the flange 646 to the position shown in FIGS. 9 and 10 such that angle Γ is at or near 90° and the liner 634 is secured to the rim 162 of the mixing bowl 24.

Figure 11:
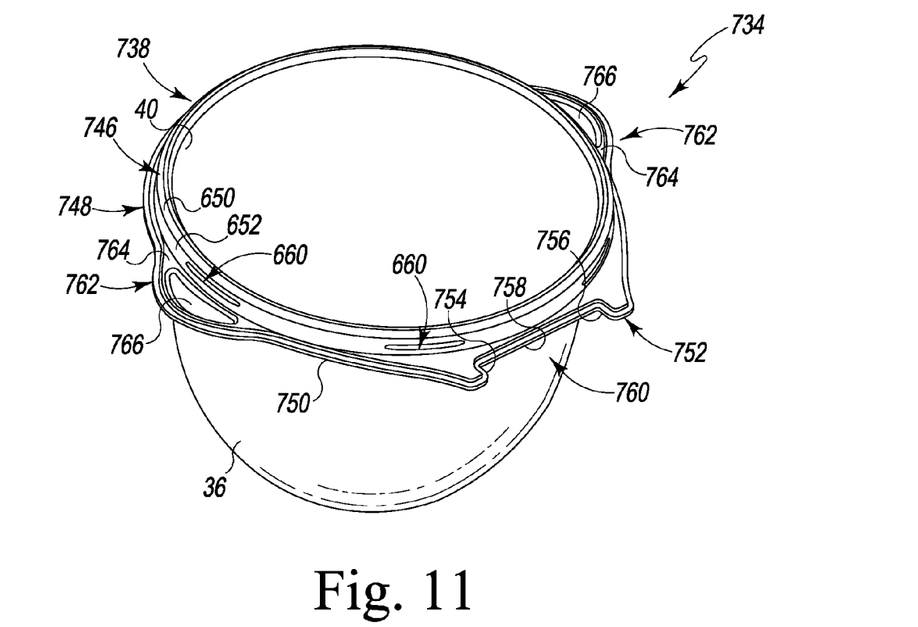
FIG. 11 is another embodiment of a bowl liner with handles.

Referring now to FIG. 11, another embodiment of a mixing bowl liner (hereinafter bowl liner 734) is illustrated. Some features of the embodiment illustrated in FIG. 11 are substantially similar to those discussed above in reference to the embodiments of FIGS. 1-10. Such features are designated in FIG. 11 with the same reference numbers as those used in FIGS. 1-10.

The bowl liner 734 includes a shell 36 and a rim 738 extending outwardly from an upper edge 40 of the shell 36. The rim 738 of the liner 734 includes an annular inner flange 746 and an annular outer flange 748 extending outwardly from the inner flange 746.

The annular inner flange 746 is substantially similar to the inner flange 646 shown and described with reference to FIGS. 8-10. The inner flange 746 is configured to couple the bowl liner 834 to the mixing bowl 24 and includes an upper wall 650 that extends outwardly from the upper edge 40 of the shell 36. The inner flange 746 also has a side wall 652 that extends downwardly from the upper wall 650. The upper wall 650 and the side wall 652 cooperate with the shell 36 to form a downward-facing slot (not shown) that is sized to receive the rim 162 of the mixing bowl 24.

The inner flange 746 also includes a plurality of tabs 660 that are attached to the side wall 652. The tabs 660 are spaced circumferentially around the shell 36 of the liner 634. Each tab 660 extends inwardly from the side wall 652 toward the shell 36. In other embodiments, the plurality of tabs may be a single tab extending partially around or all the way around the shell 36 of the liner 734.

As shown in FIG. 11, the outer flange 748 extends outwardly from the inner flange 746 to an outer perimeter surface 750. The outer flange 748, like the outer flange 48 described above in reference to FIGS. 1-4, is configured to locate the liner 734 relative to the stand mixer 10 and inhibit rotational movement of the liner 734 during the mixing operation. As shown in FIG. 11, the outer perimeter surface 750 of the outer flange has a keyed surface section 752. A pair of edge surfaces 754, 756 extend inwardly from the keyed surface section 752 to a substantially planar or flat surface 758. The surfaces 754, 756, 758 define a notch 760 in the keyed surface section 752 of the outer flange. The notch 760 is sized to receive the pedestal body 28 of the mixer 12 of the upstanding pedestal 16 to locate the liner 734 relative to the base 14 of the stand mixer 10 during a mixing operation.

The outer flange 748 of the bowl liner 734 also includes a pair of handles 762 that are configured to be grasped by a user. Each handle 762 has an upper surface 764 and a groove 766 defined in the upper surface. The handles 762 are spaced about 90 degrees from the keyed surface. In that way, the handles 762 are positioned about 180 degrees apart.

Figure 12:
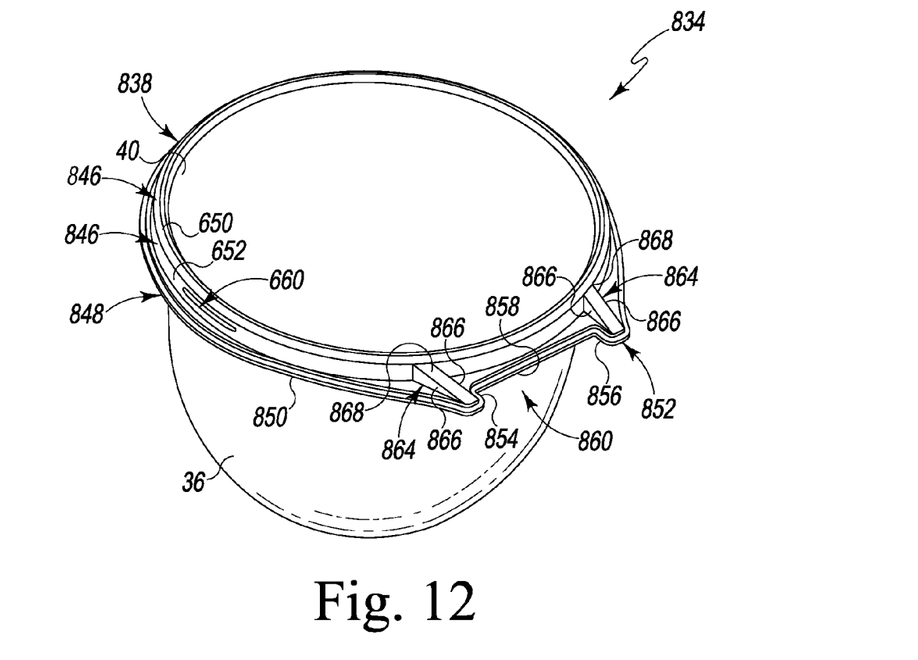
FIG. 12 is another embodiment of a bowl liner with reinforcing ribs.

Referring now to FIG. 12, another embodiment of a mixing bowl liner (hereinafter bowl liner 834) is illustrated. Some features of the embodiment illustrated in FIG. 12 are substantially similar to those discussed above in reference to the embodiments of FIGS. 1-10. Such features are designated in FIG. 11 with the same reference numbers as those used in FIGS. 1-10.

The bowl liner 834 includes a shell 36 and a rim 838 extending outwardly from an upper edge 40 of the shell 36. The rim 838 of the liner 834 includes an annular inner flange 846 and an annular outer flange 848 extending outwardly from the inner flange 846.

The annular inner flange 846 is similar to the inner flange 646 shown and described with reference to FIGS. 8-10. The inner flange 846 is configured to couple the bowl liner 834 to the mixing bowl 24 and includes an upper wall 650 that extends outwardly from the upper edge 40 of the shell 36 of the liner 834. The inner flange 846 also has a side wall 652 that extends downwardly from the upper wall 650. The upper wall 650 and the side wall 652 cooperate with the shell 36 to form a downward-facing slot (not shown) that is sized to receive the rim 162 of the mixing bowl 24

The inner flange 846 also includes a plurality of tabs 660 that are attached to the side wall 652. The tabs 660 are spaced circumferentially around the shell 36 of the liner 834. Each tab 660 extends inwardly from the side wall 652 toward the shell 36 of the liner 834. In other embodiments, the plurality of tabs may be a single tab extending partially around or all the way around the shell 36 of the liner 834.

As shown in FIG. 12, the outer flange 848 extends outwardly from the inner flange 846 to an outer perimeter surface 750. The outer flange 848, like the outer flange 48 described above in reference to FIGS. 1-4, is configured to locate the liner 834 relative to the stand mixer 10 and inhibit rotational movement of the liner 834 during the mixing operation. As shown in FIG. 12, the outer perimeter surface 850 of the outer flange has a keyed surface section 852. A pair of edge surfaces 854, 856 extend inwardly from the keyed surface section 852 to a substantially planar or flat surface 858. The surfaces 854, 856, 858 define a notch 860 in the keyed surface section 852 of the outer flange. The notch 860 is sized to receive the pedestal body 28 of the mixer 12 of the upstanding pedestal 16 to locate the liner 834 relative to the base 14 of the stand mixer 10.

The outer flange 848 of the bowl liner 834 also includes a pair of reinforcing ribs 864 that are configured to reinforce the outer flange 848 near the notch 860. Each reinforcing rib 864 is located adjacent to one of the edge surfaces 854, 856 defining the notch 860. The reinforcing ribs 864 each include a pair of triangular sidewalls 866 and a top wall 868. The triangular sidewalls 866 extend up from the outer flange 848 and are connected to the sidewall 652 of the inner flange 846. The top wall 868 connects the pair of sidewalls 866 and extends at an angle between the sidewall 652 of the inner flange 846 and the outer flange 848 so that the reinforcing ribs 864 each form a ramp shape.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A bowl liner for a mixing bowl of a stand mixer, comprising:
   a shell sized to be received in the mixing bowl, the shell being formed from an elastomeric material and having a mixing chamber defined therein, the mixing chamber having an open upper section that is open to the atmosphere when positioned within the mixing bowl and a closed bottom section connected to the open upper section by a side wall;
   a rim secured to an upper end of the shell, the rim including a curved outer perimeter surface; and
   a keyed surface section is disposed along the curved outer perimeter surface, the keyed surface section including a flat surface relative to the curved outer perimeter surface configured to locate the liner and inhibit rotation of the shell relative to a stand mixer, the keyed surface section having a notch, the notch including at least one edge and a planar surface, the at least one edge and the planar surface are configured to engage a pedestal body of the stand mixer.

2. The bowl liner of claim 1, wherein the rim includes: a first annular flange having a first wall extending outwardly from the shell and a second wall extending downwardly from the first wall, and a second annular flange extending outwardly from a lower end of the second wall of the first annular flange to the outer perimeter surface.

3. The bowl liner of claim 2, wherein the first wall and the second wall of the first annular flange define a downwardly-facing slot that is sized to receive an upper rim of the mixing bowl.

4. The bowl liner of claim 3, wherein the first annular flange includes a plurality of tabs extending from an inner surface of the second wall toward an outer surface of the shell.

5. The bowl liner of claim 2, wherein the second annular flange includes a pair of handles spaced 180 degrees apart.

6. The bowl liner of claim 2, wherein the second annular flange includes a pair of reinforcing ribs located on either side of the keyed surface section.

7. The bowl liner of claim 1, further comprising a lid secured to the rim, wherein the lid includes a plate extending over the mixing chamber and a circular bore extending through the plate.

8. The bowl liner of claim 1, wherein the side wall is a frustoconical-shaped side wall.

9. A bowl liner assembly for a mixing bowl of a stand mixer, comprising:
   a bowl liner and a plurality of interchangeable lids configured to be separately secured to the bowl liner, wherein the bowl liner includes:
   a shell sized to be received in the mixing bowl, the shell being formed from an elastomeric material and having a mixing chamber defined therein, the mixing chamber having an open upper section that is open to the atmosphere when positioned within the mixing bowl and a closed bottom section connected to the open upper section by a side wall, wherein the side wall is flexibly resilient and deformable between engaged and disengaged positions with a side wall of the mixing bowl, and
   a rim secured to an upper end of the shell, the rim including (i) an outer perimeter surface having a keyed surface section to locate the liner and inhibit rotation of the shell relative to the stand mixer, the keyed surface section having a notch , the notch including at least one edge and a planar surface, the at least one edge and the planar surface are configured to contact a pedestal body of the stand mixer and (ii) a first flange having a first wall extending outwardly from the upper end of the shell, a second wall spaced apart from the shell and extending downwardly from the first wall to form a downwardly-facing slot, and a plurality of tabs extending from an inner surface of the second wall toward an outer surface of the shell.

10. The bowl liner assembly of claim 9, wherein the rim includes a substantially planar platform and a plurality of ribs extending downwardly from the platform.

11. The bowl liner assembly of claim 10, wherein the bowl liner is configured to be received in a second bowl liner in a stacked configuration, wherein the bowl liner is stacked with the second bowl liner such that the shell of the bowl liner is received in a mixing chamber of the second bowl liner, and further wherein the ribs of the bowl liner are placed in contact with an upper surface of a rim of the second bowl liner.

12. The bowl liner assembly of claim 9, wherein the rim includes a second flange extending outwardly from the second wall of the first flange and formed to include the keyed surface section.

13. The bowl liner assembly of claim 9, wherein the plurality of interchangeable lids includes a lid including: a cover having a circular bore defined therein, and a rim extending around the cover, the rim being configured to be coupled to the rim of the bowl liner.

14. The bowl liner assembly of claim 13, wherein the plurality of interchangeable lids includes a second lid including: a cover configured to enclose the mixing chamber when the second lid is coupled to the bowl liner, and a rim extending around the cover and being configured to be coupled to the rim of the bowl liner.

15. A stand mixer comprising:
a base,
a mixer head positioned above the base,
a pedestal extending upwardly from the base and supporting the mixer head,
a mixing element extending downwardly from the mixer head,
a mixing bowl positioned under the mixer head, the mixing bowl including an upper rim and an inner surface extending downwardly from the upper rim to define a bowl chamber, and
a bowl liner being formed from an elastomeric material positioned in the bowl chamber of the mixing bowl, the bowl liner further comprising:
a closed liner base in contact with the inner surface of the mixing bowl,
a liner rim positioned above the base to define an open upper section, the liner rim having a keyed surface section configured to locate the liner to a portion of the stand mixer and inhibit rotation of the bowl liner,
a frustoconical-shaped side wall connecting the base and the liner rim to define a mixing chamber, a first section of the frustoconical-shaped side wall of the mixing chamber being spaced apart from the inner surface of the mixing bowl, and wherein the mixing element is configured to engage the first section of the frustoconical-shaped side wall of the mixing chamber to advance the first section of the elastomeric material into contact with the inner surface of the mixing bowl, such that the keyed surface section prevents rotation of the bowl liner during engagement of the mixing element with the frustoconical-shaped side wall relative to the mixing bowl, the keyed surface section having a notch, the notch including at least one edge and a planar surface, the at least one edge and the planar surface are configured to contact the pedestal.

16. The stand mixer of claim 15, wherein the liner is formed from semitransparent polypropylene.

17. The stand mixer of claim 15, wherein the liner rim includes an outer perimeter surface having the keyed surface section to locate the liner relative to the base of the stand mixer.

18. The stand mixer of claim 15, further comprising a lid coupled to the liner rim, wherein the mixing element extends through a bore formed through the lid.

* * * * *